June 30, 1970  J. W. ORNER  3,517,548
MEANS FOR AND METHOD OF DETECTING LEAKS
IN THE SEAL OF A COMPONENT
Filed June 20, 1968
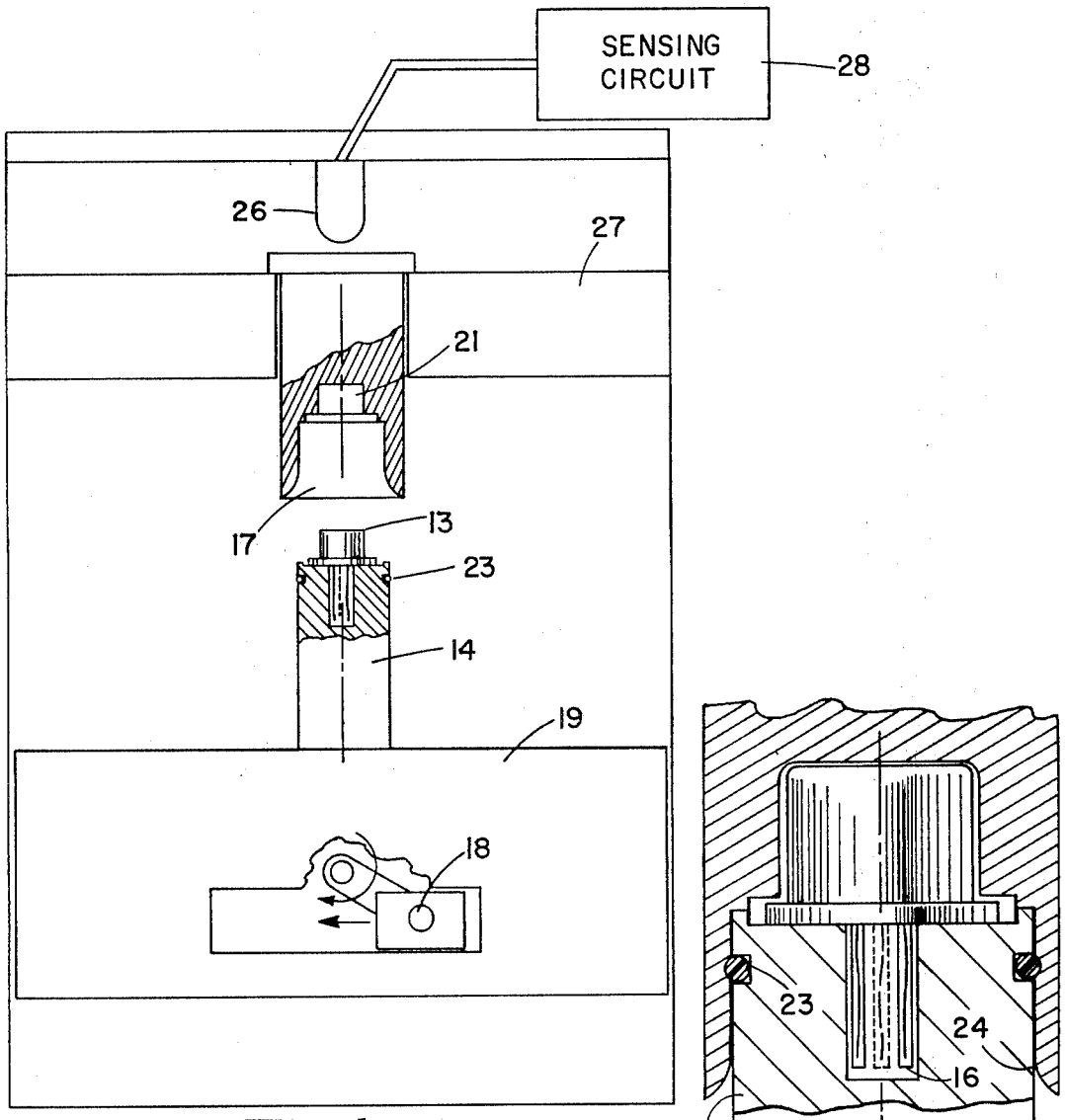
*Fig.1*
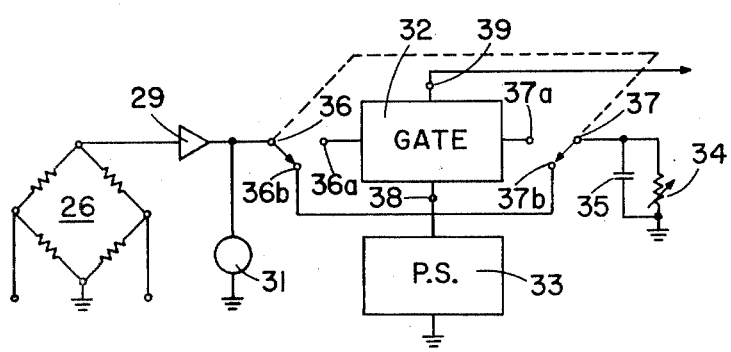
*Fig.3*
*Fig.2*
INVENTOR.
JOHN W. ORNER
BY Charles M. Hogan
   Abraham Ogman
   ATTORNIES

United States Patent Office 3,517,548
Patented June 30, 1970

---

3,517,548
MEANS FOR AND METHOD OF DETECTING LEAKS IN THE SEAL OF A COMPONENT
John W. Orner, Woburn, Mass., assignor to Avco Corporation, Cincinnati, Ohio, a corporation of Delaware
Filed June 20, 1968, Ser. No. 738,487
Int. Cl. G01m 3/02
U.S. Cl. 73—49.3            10 Claims

ABSTRACT OF THE DISCLOSURE

A method and apparatus for detecting and measuring gross leaks in hermetically sealed components or devices and is applicable to components which can be subjected to a gas or air under pressure, and which contain a volume of free space within them. The leak detector includes a cylinder containing a gas-filled cavity with an opening to receive a plunger. A plunger conforming in shape and dimension with the cavity opening is provided. It also contains means for mounting a test component to be inserted within the cavity. When the plunger is inserted into the cavity it compresses the gas. An indicator which measures and displays the magnitude of pressure of the compressed gas is provided. The magnitude of pressure is an indication of whether or not the test component contains a gross leak.

---

Present methods of leak detection used for testing hermetically sealed devices involving the helium mass spectrometer and the Radi-Flo apparatus have proved to be effective and adequate in the range from about about $10^{-4}$ to $10^{-11}$ cubic centimeters per second per atmosphere pressure differential; but are inefficient and unreliable for leak rates larger than this. This invention pertains principally to these larger leak rates which are here defined as gross leaks.

Methods presently in use for the detection of gross leaks in hermetically sealed devices include such tests as immersion in a hot liquid and a visual examination for the escape of gas bubbles due to the thermal expansion of the internal air, or, in the case of electronic components such as transistors, the device is pressurized in an aqueous solution of detergent followed by a functional test of its electrical characteristics. Any penetration of the detergent solution will degrade the normal electrical performance of the device thereby revealing the existence of a gross leak in the sealed enclosure.

These methods of detecting gross leaks in hermetically sealed devices have a number of disadvantages which not only add to the difficulty of testing, but also give rise to uncertain ties and lack of reliability. For example, none of the methods in current use are readily adaptable to the requirements of modern high-speed automatic production. The bubble method is almost entirely operator dependent and is therefore subject to the vagaries of human nature for the interpretation of the test. The detergent method depends upon a comparison of electrical measurements made before and after pressurization in the detergent solution; it is, therefore, only really applicable to certain classes of electrical or electronic devices. Furthermore, a serious disadvantage of this method is that should a relatively small leak exist, only a small amount of the solution will enter the device without necessarily coming into contact with any of the active electrical elements, thus the normal electrical characteristics of the device will not immediately be affected and the leak will pass unnoticed. In such cases, the detergent solution often eventually finds its way on to the active elements, particularly under the influence of vibration during its normal service, and thus cause a premature service failure.

Most of the presently used methods of detecting gross leaks in small sealed devices offer no ready means for performing quantitative measurements of leak rates thus increasing the difficulty of standardization. One of the objects of this invention is to provide a method and apparatus for detecting and measuring the rate of gross leaks in hermetically sealed devices.

Other objects of the invention are to provide a method and apparatus for detecting leaks in the seal of a component which:

(1) acts quickly and is adaptable for use on production lines,
(2) has a high degree of discrimination,
(3) is simple to make and operate,
(4) includes means for determining the size of the leak, and
(5) generates its own sensing pressure.

In accordance wyith the invention an apparatus for detecting leaks in hermetically sealed components comprises a cylinder having a cavity. A portion of the cavity is shaped to conform to the external shape of the test component. A plunger adapted to fit into the cylinder is provided with means for mounting the test component on a surface opposite the cavity. Means is provided for inserting the plunger into the cavity and for sealing said cavity when the plunger is inserted for generating a pressure buildup within the cavity. Means is also provided for measuring the magnitude of the pressure or its analog as an indication whether a leak exists in the hermetically sealed test component.

Also in accordance with the invention a method of testing a seal of a hermetically sealed test component comprises providing a cavity and providing a plunger on which the test component is mounted. The plunger and component are driven into the cavity sealing and trapping the gas within the cavity and causing an increase in pressure of the gas inside the cavity. The cavity pressure is measured as an indication of whether a leak exists in the hermetically sealed test component.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a schematic representation of an apparatus used for detecting leaks in a hermetically sealed component.

FIG. 2 is a schematic representation of an electronic circuit sensing circuit used in conjunction with the FIG. 1 apparatus to accept or reject a component.

FIG. 3 is an enlarged representation of the interface between a cylinder and a plunger found in the FIG. 1 apparatus.

DESCRIPTION AND OPERATION

For purposes of illustration, the detection of a leak in the hermetical seal of a transistor will be described. In reality, and as will become evident hereinafter, the apparatus will function with an infinite variety of components such as watches, electromechanical components, quartz crystals, to name a few.

The leak testing method which is the subject of this invention depends upon the fact that a perfectly sealed hollow enclosure, when subjected to a pressure of gas, will displace an amount of gas equal to its own external volume. If, however, the hermetic sealing is not perfect, and a gross leak exists, the amount of pressurized gas displaced will be less by an amount equal to the total internal volume of the hollow enclosure once the internal and the external pressures have equalized by virtue of the leak.

The exponential rate at which this pressure equalization occurs, in conjunction with the predetermined internal volume of the enclosure, will enable a calculation of the equivalent leak size in accordance with a well-known logarithmic equation relating these parameters.

In order to measure the volume of pressurized gas displaced by the device under test reliably, quickly and with a high degree of discrimination, it will be necessary to pressurize it in a pressure chamber with an internal size and configuration very similar to its own. FIG. 1 illustrates an apparatus 10 that can be used in the case of small single ended cylindrical components, such as transistors.

A transistor 13 under test is placed on top of a plunger 14 into which the appropriate number of small holes 16 (see FIG. 3) have been drilled to accommodate the lead wires. When the plunger 14 is forced into a cylinder cavity 17 by means of crank pin 18 acting through sliding member 19 to the point where the transistor 13 enters the contoured enclosure 21 in cylinder cavity 17, the transistor 13 will be subjected to a gas pressure which will be a function of a predetermined compression ratio. Leakage past the plunger 14 is prevented by O-ring 23 fitted near the top of the plunger 14. The compression ratio is determined by the length of the compression stroke, and the residual volume existing between the transistor 13 and the contoured enclosure 21 machined into cylinder cavity 17. If the apparatus is so designed that the length of the stroke is constant, then the maximum pressure attained will be dependent on the volume of gas displaced by the transistor, which in turn will depend upon whether or not a gross leak exists in the hermetic seal of the transistor 13.

An important consideration is the ratio of the residual volume to the internal free space volume of the test components. The residual volume is defined as that part of the cavity volume which lies between the walls of the cavity and the case of the test components when the plunger is fully inserted within the cavity. The internal free space volume is defined as that internal volume of the test components not taken up by solid or other material and into which a gas can penetrate.

It is clear that if the ratio of residual volume to internal free space volume is small there will be a large pressure difference in pressure in the residual volume depending upon whether the test component has a leak or not. For example, if the ratio of residual volume to internal free space volume is 0.1, the pressure within the residual volume, in the event there is a leak in the test components, will be approximately $\frac{1}{10}$ of the pressure generated in the event there is no leak. A volumetric ratio of 1 will account for a 50% lower pressure and so on. As a practical matter, the ratio should not be increased above 1 as the accuracy of the system deteriorates rapidly.

The initial volume is defined as the volume of gas trapped in the cavity when the cavity is first sealed by the plunger as at 14. The ratio of initial volume to residual volume—the compression ratio—determines the final gas pressure. It also therefore, determines the response time as the drop off of pressure within the residual volume is a function of the initial pressure which in turn is a function of the ratio of the initial volume to the residual volume. The compression ratio is varied with the test equipment, twenty-to-one is suitable for transistor. A much lower ratio, about 2–5 is recommended for Ping-pong balls, for example.

The cylinder cavity and plunger can be designed so as to be easily replaceable in order to accommodate a variety of sizes and shapes of components that can be leak tested by means of this apparatus.

The pressure attained in the test cylinder cavity 17 is measured by means of a strain-gage load cell 26, such as Model ER60 manufactured by Coutant Manufacturing Company of England, mounted in such a way that it restrains the movement of the cylinder 17 which is loosely held in place and positioned by cylinder holder 27.

The electrical output of the strain-gage load cell 26 is indicated on a meter, electrical recorder, or other electrical indicating or sensing circuit 28, preferably calibrated to indicate the absence or presence of a leak.

For purposes of automated operation, it is necessary to compare the rate of leakage with that of a known standard so that the decision to accept or reject can be made in accordance with any predetermined requirements. Such a comparison, and resulting decision, can be made entirely automatically in accordance with any chosen standard rate of leakage.

The output voltage from the strain-gage load cell 26, or an associated amplifier, will, as before stated, fall off at an exponential rate which will be a function of the leak rate in any device under test. If this voltage is compared with the voltage across the capacitor of a capacitor-resistor combination in a time delay circuit, then the leakage rate can be used to initiate a control signal depending upon whether its electrical readout signal falls at a greater or a lesser rate than the known exponential decay of the voltage across the electrical time delay circuit.

The circuitry required for automated operation is illustrated in FIG. 2. The strain-gage load cell 26 generates an electrical signal which is directly proportional to the pressure in the test chamber containing the component to be leak tested. This signal, after amplification by amplifier 29, actuates a readout device such as meter 31 and also charges capacitor 35 through the mechanically-linked switches 36 and 37. After completion of the pressure stroke, and a short time delay to allow for thermal equilibrium in the pressure chamber, switches 36 and 37 are simultaneously operated thus connecting the amplifier output and the charged capacitor to terminals 36a and 37a, respectively of a comparator gate 32. At the instant of switching, the voltages impressed on terminals 36a and 37a will be identical; however, they will both begin to decay. The voltage on terminal 36a will decay exponentially at a rate which is directly proportional to the rate of leakage in the component under test in the pressure chamber, whereas the voltage on capacitor terminal 37a will decay exponentially at a rate determined by the pre-set value of the variable time constant generated by capacitor 35 in combination with resistor 34. Comparator gate 32 is an electronically controlled gate circuit, operating in accordance with well-known principles of the electronic art, such that terminals 38 and 39 will remain isolated from each other as long as the voltage on terminal 36a is equal to or greater than the voltage on terminal 37a. Should, however, the voltage on terminal 36a fall to a value lower than that on terminal 37a due to excessive leakage in the component under test, then the terminals 38 and 39 on the comparator gate 32 will be electrically connected together allowing power from power supply 33 to flow through the comparator gate 32 to actuate the appropriate control circuitry to reject the leaking component.

In this way, the decision to accept or reject the component under test for imperfect hermetic sealing can be made entirely automatically in accordance with any predetermined leak rate specification simply by making the appropriate adjustment to the variable time delay resistor 34.

The entire leak detecting process is very fast, efficient and reliable. It can easily be inserted in an automated production line.

Because the volumetric relationships between the residual volume, the internal free space volume, and the initial volume are considered in the design of the cavity and plunger, the system described particularly if the preferred volumetric ratios are used is extremely sensitive to gross leaks of wide magnitude.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A device for testing the seal of a hermetically sealed test component comprising:
   a cylinder containing a gas filled cavity with an opening to receive a plunger;
   a plunger conforming in shape and dimensions with the cavity opening containing means for mounting a test component on a surface to be inserted within the cavity;
   means for inserting the plunger into said cavity for compressing the gas contained in the cavity; and
   means for indicating the magnitude of the pressure of the compressed gas.

2. An apparatus as described in claim 1 in which a portion of the cylinder cavity is shaped to conform with the external shape of the test component and is positioned to receive the test component.

3. An apparatus as described in claim 1 in which the cavity is configured to produce a residual cylinder cavity volume equal to or less than the internal free space volume of the test component.

4. An apparatus as described in claim 3 in which the ratio of the internal free space volume to the residual cylinder cavity volume is at least 10 to 1.

5. An apparatus as described in claim 1 which includes in addition means for acceptance or rejection of the test component as a function of the pressure of the compressed gas.

6. An apparatus as described in claim 1 which includes in addition means responsive to the rate of change of pressure within the residual cavity for signaling acceptance or rejection of a test component.

7. An apparatus as described in claim 1 which includes means for reciprocating said plunger into and out of the cylinder cavity.

8. A method of testing the seal of a hermetically sealed test component comprising the steps of:
   inserting at least the test specimen into a gas-filled cavity;
   compressing the gas in the cavity to create a residual volume in the cavity which is at most equal to the internal free space volume of the test component; and
   measuring the pressure of the compressed gas as an indication of the presence or the absence of a leak in the seal of the test component.

9. A method as described in claim 8 in which the ratio of internal free space volume to the residual volume is 10 to 1.

10. A method as described in claim 8 in which the pressure measurement relates to the rate of change of gas pressure in the cavity.

References Cited

UNITED STATES PATENTS 2,467,767   4/1949   Mertler   73—49.3

S. CLEMENT SWISHER, Primary Examiner

W. A. HENRY II, Assistant Examiner